United States Patent [19]

Zidovec et al.

[11] Patent Number: 5,562,830
[45] Date of Patent: Oct. 8, 1996

[54] CALCIUM CARBONATE SCALE CONTROLLING METHOD

[75] Inventors: Davor F. Zidovec; Preetha M. Prabhu, both of Jacksonville, Fla.

[73] Assignee: Betz Laboratories, Inc., Trevose, Pa.

[21] Appl. No.: 528,460

[22] Filed: Sep. 14, 1995

[51] Int. Cl.⁶ ........................................... C02F 5/14
[52] U.S. Cl. ................. 210/699; 162/38; 162/48; 252/180; 252/389.23; 422/15
[58] Field of Search ............... 162/38, 48, DIG. 4; 210/698, 699; 252/180, 389.23; 422/15, 17

[56] References Cited

U.S. PATENT DOCUMENTS

| | | |
|---|---|---|
| 3,933,427 | 1/1976 | Bohnsack et al. ............ 21/2.7 A |
| 4,479,878 | 10/1984 | Becker ............................ 210/699 |
| 5,062,962 | 11/1991 | Brown et al. ................... 210/698 |
| 5,147,555 | 2/1992 | Brown et al. ................... 210/698 |
| 5,256,332 | 10/1993 | Kessler ........................... 252/396 |
| 5,344,590 | 9/1994 | Carter et al. .................... 252/396 |
| 5,378,372 | 1/1995 | Carey et al. .................... 210/697 |

FOREIGN PATENT DOCUMENTS 4166298  6/1992  Japan.

*Primary Examiner*—Peter A. Hruskoci
*Attorney, Agent, or Firm*—Alexander D. Ricci; Steven D. Boyd

[57] ABSTRACT

A method of inhibiting corrosion and scale formation and deposition in aqueous systems by adding a combination of a polyepoxysuccinic acid or salts thereof and a phosphonocarboxylic acid or salts thereof.

7 Claims, 2 Drawing Sheets

CALCIUM CARBONATE SCALE CONTROLLING METHOD

FIELD OF THE INVENTION

The present invention relates to the treatment of water to inhibit the formation of corrosion and scale. More particularly, the present invention relates to the use of a combination of a polyepoxysuccinic acid and a phosphonocarboxylic acid to inhibit calcium carbonate scale formation in aqueous systems.

BACKGROUND OF THE INVENTION

Although the present invention has general applicability to any given aqueous system where the formation and deposition of scale and in particular calcium carbonate scale is a potential problem, the invention will be discussed in detail as it concerns systems encountered in the paper industry. In addition to the paper industry, scale formation and deposition may be problematic in aqueous systems such as boiler water systems, cooling water systems and gas scrubber systems.

In paper manufacturing facilities the formation and deposition of scale forming materials can cause quality and efficiency problems in the pulp and papermaking systems. Calcium carbonate is a common scale in kraft digesters, green liquor lines and bleach plant extraction stages. Kraft processing is a predominant pulping method due to its efficient recovery process for the cooking chemicals. In a kraft process the cooking solution is known as white liquor and contains NaOH and $Na_2S$. The white liquor is used to cook wood chips in a digester. In the cooking process, lignin, which binds the wood fiber together is dissolved in the white liquor forming pulp and black liquor. Upon separation, the black liquor is concentrated and burned in a recovery furnace to provide power and allow the recycle of chemicals. In burning black liquor an inorganic smelt of $Na_2CO_3$ and $Na_2S$ is formed. This smelt is dissolved in water to form green liquor which is reacted with quick lime (CaO) to convert $Na_2CO_3$ into NaOH and regenerate white liquor. This conversion is typically 85–95% efficient leaving a small percentage of $Na_2CO_3$ in the white liquor.

In the digester where wood chips are cooked with white liquor, calcium is leached from the wood or is present in the recycled chemicals along with $Na_2CO_3$ and other sodium salts. At low temperatures lignin is a good complexing agent for these materials but at higher temperatures these complexes can decompose during the cooking process giving rise to free calcium ions. In the separation of black liquor from the pulp, filter screens can be contaminated with scales such as $CaCO_3$ which restrict the flow of the black liquor.

In the formation of green liquor by evaporating, oxidizing and forming a smelt from the black liquor, the formation of scale is possible when the smelt is dissolved in water to form green liquor. Scale, such as calcium carbonate scale can restrict or block the flow in green liquor lines.

In a bleach plant extraction stage chlorinated and oxidized lignin is removed by dissolution in a caustic solution. This process is typically carried out at temperatures between 60° and 80° C. and a final pH of about 10.8. Calcium ions, which would give rise to calcium carbonate scale formation, are less likely where bleaching virgin pulp since it would have been removed in earlier stages. However, when recycled paper is used in forming the pulp, $CaCO_3$ from coatings or fillers can cause the formation of $CaCO_3$ scale.

Deposit control agents such as phosphates, phosphonates and polyacrylates are often used to inhibit calcium carbonate scale formation in industrial cooling water systems. The use of polyacrylate alone is not effective at high calcium concentrations because undesirable polyacrylate—calcium adducts are formed reducing efficacy. Although phosphonates are very effective at controlling carbonate scale formation, they can produce insoluble phosphonate—calcium complexes or calcium phosphate scale upon degradation. Further, current limits on phosphate discharge limit the acceptability of the use of phosphonates for water treatment. Certain phosphonates exhibit excellent calcium tolerance, that is the ability to inhibit calcium carbonate scale in water having a propensity toward scale deposition.

Preventing the corrosion and scaling of pulp and paper manufacturing equipment is essential to the efficient and economical operation of such systems. Excessive corrosion of metallic surfaces can cause the premature failure of process equipment, necessitating downtime for the replacement or repair of the equipment. Additionally, the buildup of corrosion products on heat transfer surfaces impedes water flow and reduces heat transfer efficiency, thereby limiting production or requiring downtime for cleaning. Reduction in efficiency will also result from scaling deposits which retard heat transfer and hinder water flow.

Scale can also cause flow restrictions or rapid localized corrosion and subsequent penetration of metallic surfaces through the formation of differential oxygen concentration cells. The localized corrosion resulting from differential oxygen cells originating from deposits is commonly referred to as "underdeposit corrosion". Therefore, effective control of scaling will also materially affect corrosion.

Methods of inhibiting the formation and deposition of scale imparting compounds in aqueous systems comprising treating the system with a polyepoxysuccinic acid are disclosed in U.S. Pat. Nos. 5,062,962 and 5,147,555. Japanese patent publication 4-166298 discloses methods for preventing metal corrosion and scale generation in aqueous systems by adding polyepoxysuccinic acid or its salts. U.S. Pat. No. 5,344,590 discloses a method for inhibiting corrosion of metal using one or more polytartaric acid compounds (also known as polyepoxysuccinic acids) of a specific molecular weight range. A process for preventing corrosion and the formation of scale in water conducting systems comprising adding one or more phosphonocarboxylic acids or their water soluble salts and optionally other corrosion inhibitors is disclosed in U.S. Pat. No. 3,933,427. U.S. Pat. No. 5,256,332 discloses a method of inhibiting corrosion in aqueous systems. The method comprised adding to an aqueous system a blend of effective amounts of orthophosphate, a polyepoxysuccinic acid, a water soluble azole compound and a copolymer of acrylic acid and an allyl hydroxy propyl sulfonate ether monomer.

SUMMARY OF THE INVENTION

Figure 1:
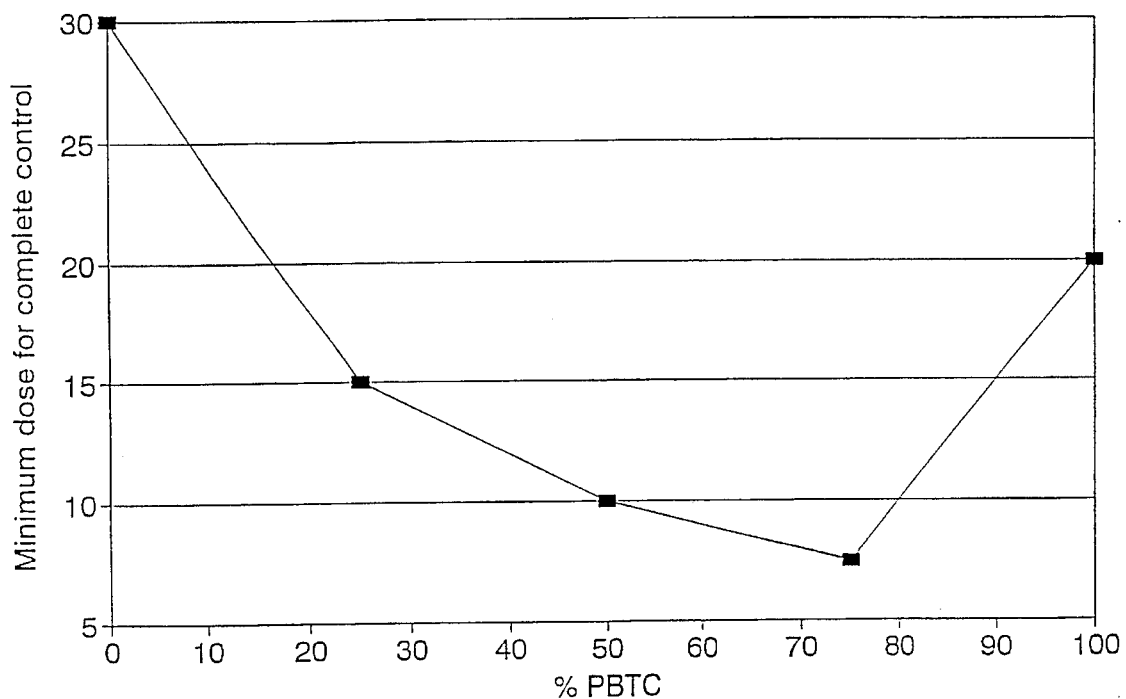
FIG. 1 is a graph of treatment for complete scale control (ppm) versus PBTC treatment in percent by weight, for PBTC-PESA blend treatments.

The present inventors have discovered an unexpected synergy in the control of scale formation and deposition inhibition when a combination of polyepoxysuccinic acid or salts thereof and a phosphonocarboxylic acid or salts thereof are added to an aqueous system. The combination of the present invention was found to provide unexpected efficacy at inhibiting scale formation in aqueous systems. The combination treatment of the present invention is added to aqueous systems at substoichiometric levels to inhibit scale formation and corrosion.

DESCRIPTION OF THE PREFERRED EMBODIMENTS

The present invention relates to a novel combination for inhibiting the formation and deposition of scale and corrosion in aqueous systems such as pulp and paper systems. The combination of the present invention comprises a polyepoxysuccinic acid (PESA) of the general formula:

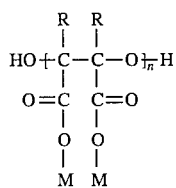

where n ranges from about 2 to about 50, preferably 2 to 25, M is hydrogen or a water soluble cation such as $Na^+$, $NH_4^+$, or $K^+$ and R is hydrogen, $C_{1-4}$ alkyl or $C_{1-4}$ substituted alkyl (preferably R is hydrogen); and a Phosphonocarboxylic acid (PCA) of the general formula:

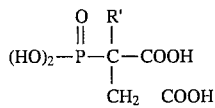

wherein R' is hydrogen, a $C_{1-4}$ substituted alkyl, alkenyl or alkinyl group; an aryl; cycloalkyl or aralkyl group or the group:

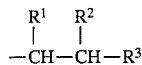

in which $R^1$ represents hydrogen, a $C_{1-4}$ alkyl or a carboxyl group; $R^2$ represents hydrogen or methyl; and $R^3$ represents a carboxyl group.

A preferred phosphonocarboxylic acid is 2-phosphonobutane-1,2,4-tricarboxylic acid (PBTC).

The ratio of PESA to PCA can range from about 1% to 99% PESA: to about 99% PCA to 1% PCA (all percentages herein are by weight unless otherwise noted). The combination can be added to an aqueous system in treatment levels of from about 25 parts per billion up to 500 parts per million, preferably from about 2 parts per million up to about 200 parts per million. The concentration of the combination necessary to provide effective scale control will, of course, vary from system to system. The treatment level will vary, in part, with changes in temperature, pH and LSI (Langelier Saturation Index). However, in all cases, the concentration of the combination added to an aqueous system in accordance with the present invention is at substoichiometric concentrations. That is, the total concentration of the combination added is much lower than the concentration of scale forming materials in the system to be treated.

The present invention will now be further described with reference to a number of specific examples which are to be regarded solely as illustrative and not as restricting the scope of the present invention.

EXAMPLE

The scale imparting activity of PESA, PBTC and combinations of PESA and PBTC was tested in a dynamic scaling apparatus which consisted of a temperature controlled stainless steel tube through which a solution, supersaturated with respect to $CaCO_3$, was pumped. Scaling was measured by monitoring the rate of increase in pressure needed to keep a constant flow of the solution through the system.

Example 1

The conditions of the tests were as follows: Ca 150 ppm as $CaCO_3$; $CO_3$ 1000 ppm as $CO^{-2}_3$; pH 12.5 (at room temperature) adjusted with NaOH; temperature 101° C.

Under these conditions, with untreated solution, calcium carbonate scaling occurred rapidly. The scale was found to be the aragonite form by FTIR. The minimum dose of PBTC needed to completely stop scale formation was found to be 20 ppm. The minimum dose of PESA needed to completely stop scale formation was found to be 30 ppm. The surprising effect of combinations of PBTC and PESA is shown in Table I as summarized in FIG. 1.

TABLE I

Minimum Doses for Complete Control of $CaCO_3$ ppm Total Actives

| % PESA | 0 | 25 | 50 | 75 | 100 |
|---|---|---|---|---|---|
| % PBTC | 100 | 75 | 50 | 25 | 0 |
| Minimum Dose | 20 | 7.5 | 10 | 15 | 30 |

The data in Table I as shown clearly in FIG. 1 indicates that a mixture of PBTC and PESA provides for scale and corrosion inhibition to an extent greater than would be expected from their individual efficacies.

Example 2

The conditions of the tests were as follows: Ca 150 ppm as $CaCO_3$; $CO_3$ 3300ppm as $CaCO_3$; pH 12.4 (at room temperature); temperature 80° C. Table II summarizes the results

TABLE II

Minimum Doses for Complete Control of $CaCO_3$ ppm Total Actives

| % PESA | 0 | 50 | 71.4 | 80 | 100 |
|---|---|---|---|---|---|
| % PBTC | 100 | 50 | 28.6 | 20 | 0 |
| Minimum Dose | 3.5 | 5.5 | 6.5 | 11.2 | 15.0 |

Figure 2:
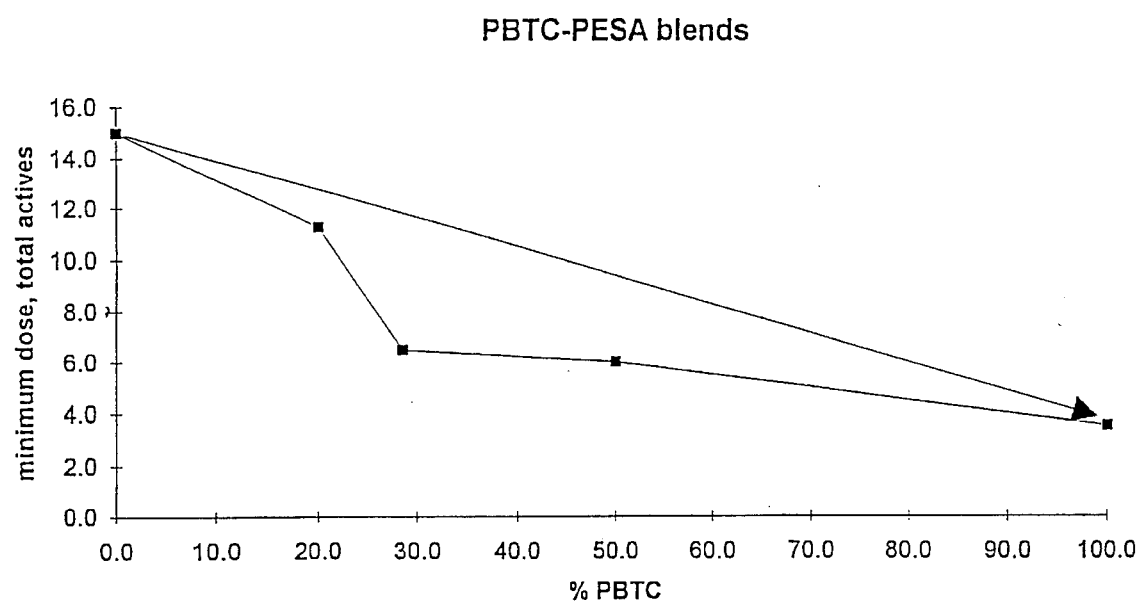
FIG. 2 is a graph of treatment for complete scale control (ppm) versus PBTC treatment in percent by weight, for PBTC-PESA blend treatments.

The data from Table II is shown in FIG. 2.

The synergy shown in the above examples for PESA-PBTC blends in controlling $CaCO_3$ scale has also been documented for the control of $CaF_2$ scale at high pH (about pH 11) as would be significant in gas scrubber systems.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

What is claimed is:

1. A method of controlling the formation and deposition of scale including calcium carbonate and corrosion in an aqueous system comprising introducing into said aqueous system, a substoichiometric amount sufficient for the purpose of a treatment consisting essentially of a polyepoxysuccinic acid of the general formula:

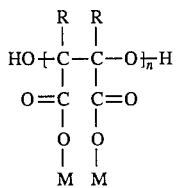

wherein n ranges from about 2 to about 50, M is hydrogen or a water soluble cation and R is hydrogen, $C_{1-4}$ alkyl or $C_{1-4}$ substituted alkyl; and a phosphonocarboxylic acid (PCA) of the general formula:

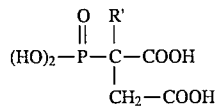

wherein R' is hydrogen or a $C_{1-4}$ alkyl, $C_{1-4}$ alkenyl, $C_{1-4}$ alkinyl, aryl, cycloalkyl, aralkyl or the group:

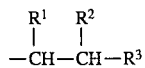

wherein $R^1$ is hydrogen, a $C_{1-4}$ alkyl or carboxyl, $R^2$ is hydrogen or methyl and $R^3$ is carboxyl wherein the ratio of polyepoxysuccinic acid to phosphonocarboxylic acid ranges from about 1% polyepoxysuccinic acid: 99% phosphonocarboxylic acid to about 99% polyepoxysuccinic acid: 1% phosphonocarboxylic acid.

2. The method of claim 1 wherein said treatment is added to said aqueous system in a concentration of from about 25 parts per billion up to about 500 parts per million.

3. The method of claim 2 wherein said treatment is added to said aqueous system in a concentration of from about 2 parts per million up to about 200 parts per million.

4. The method of claim 1 wherein said phosphonocarboxylic acid is selected from the group consisting of alpha methylphosphonosuccinic acid, phosphonosuccinic acid, 1-phosphonopropane-2,3-dicarboxylic acid, and 2-phosphonobutane-1,2,4-tricarboxylic acid.

5. A method of inhibiting corrosion and the formation of calcium carbonate scale in a pulp and paper processing system comprising introducing into said system a substoichiometric amount sufficient for the purpose of a treatment consisting essentially of a combination of a polyepoxysuccinic acid of the general formula:

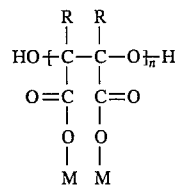

wherein n ranges from about 2 to about 50, M is selected from the group consisting of hydrogen $Na^+$, $NH_4^+$ and $K^+$ and R is hydrogen, $C_{1-4}$ alkyl or $C_{1-4}$ substituted alkyl 2-phosphonobutane-1,2,4-tricarboxylic acid wherein the ratio of polyepoxysuccinic acid to 2-phosphonobutane-1,2,4-tricarboxylic acid is from about 1% polyepoxysuccinic acid: 99% 2-phosphonobutane-1,2,4-tricarboxylic acid to about 99% polyepoxysuccinic acid: 1% 2-phosphonobutane-1,2,4-tricarboxylic acid.

6. The method of claim 5 wherein said treatment is added to said system in a concentration of from about 25 parts per billion up to about 500 parts per million.

7. The method of claim 6 wherein said treatment is added to said system in a concentration of from about 2 parts per million up to about 200 parts per million.

* * * * *